United States Patent Office 2,925,367
Patented Feb. 16, 1960

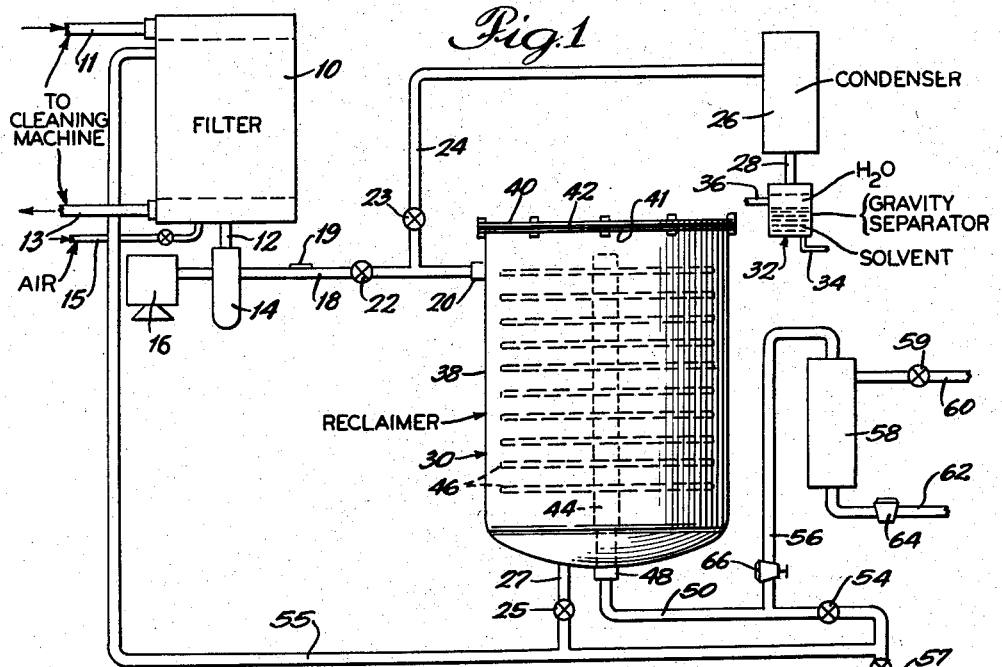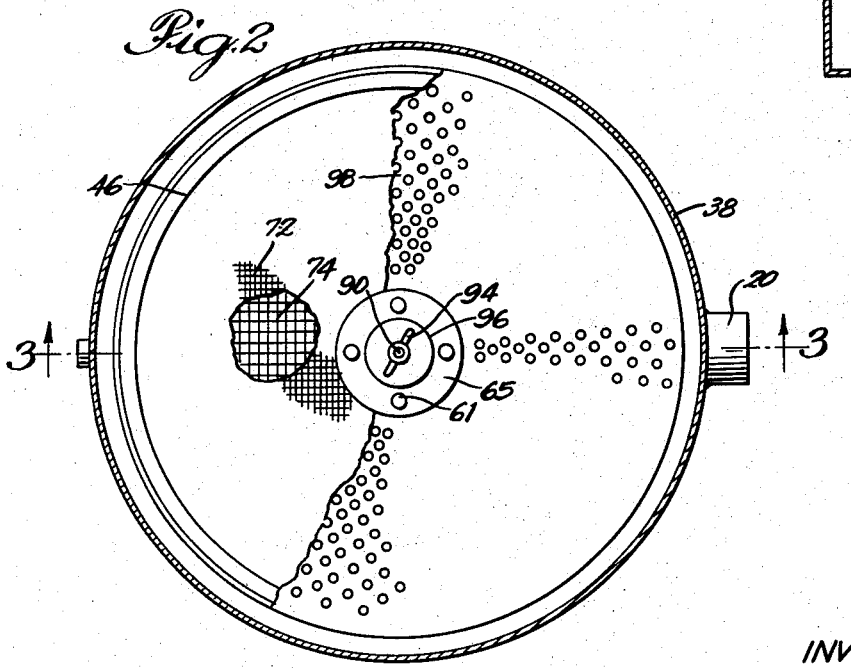

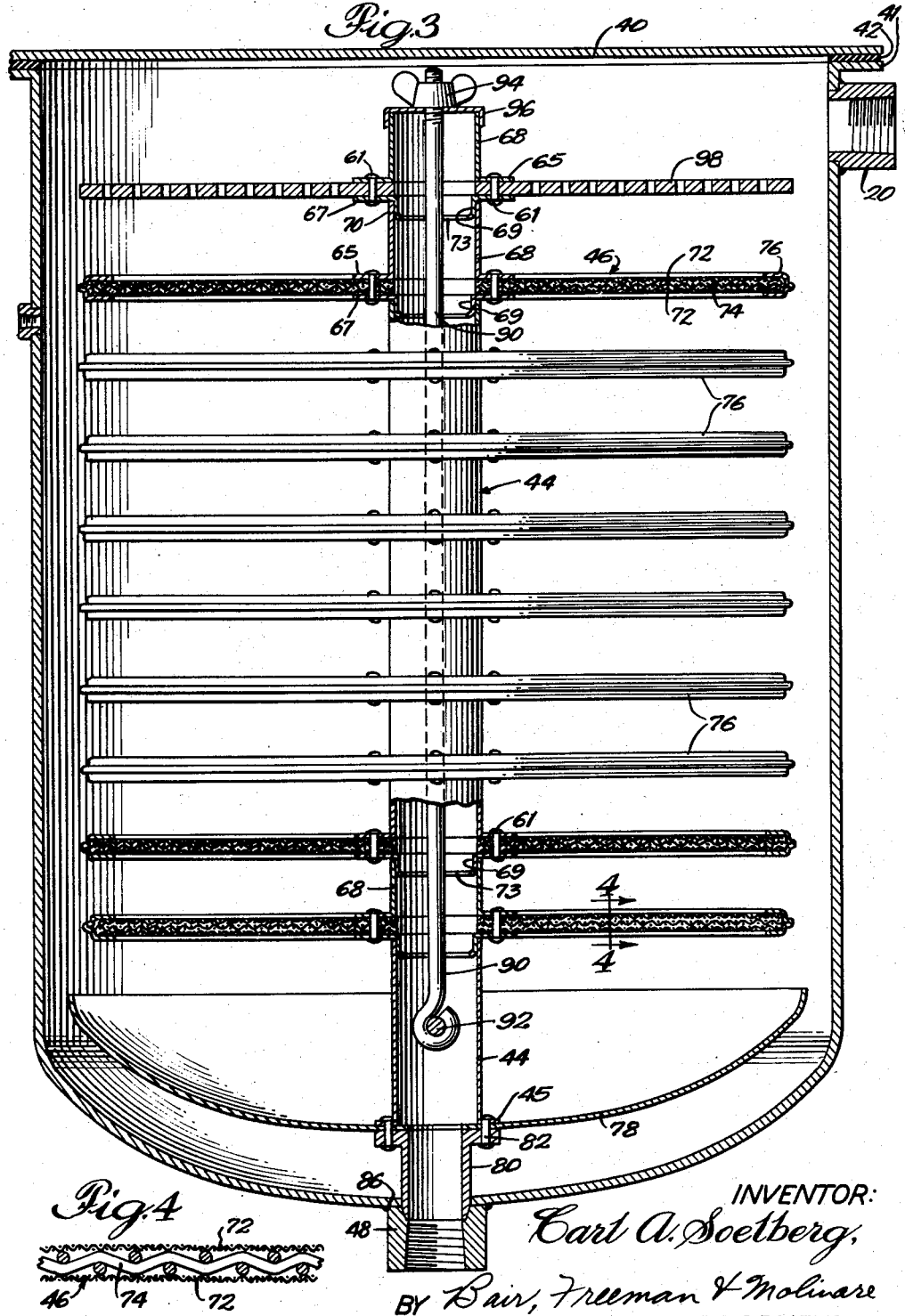

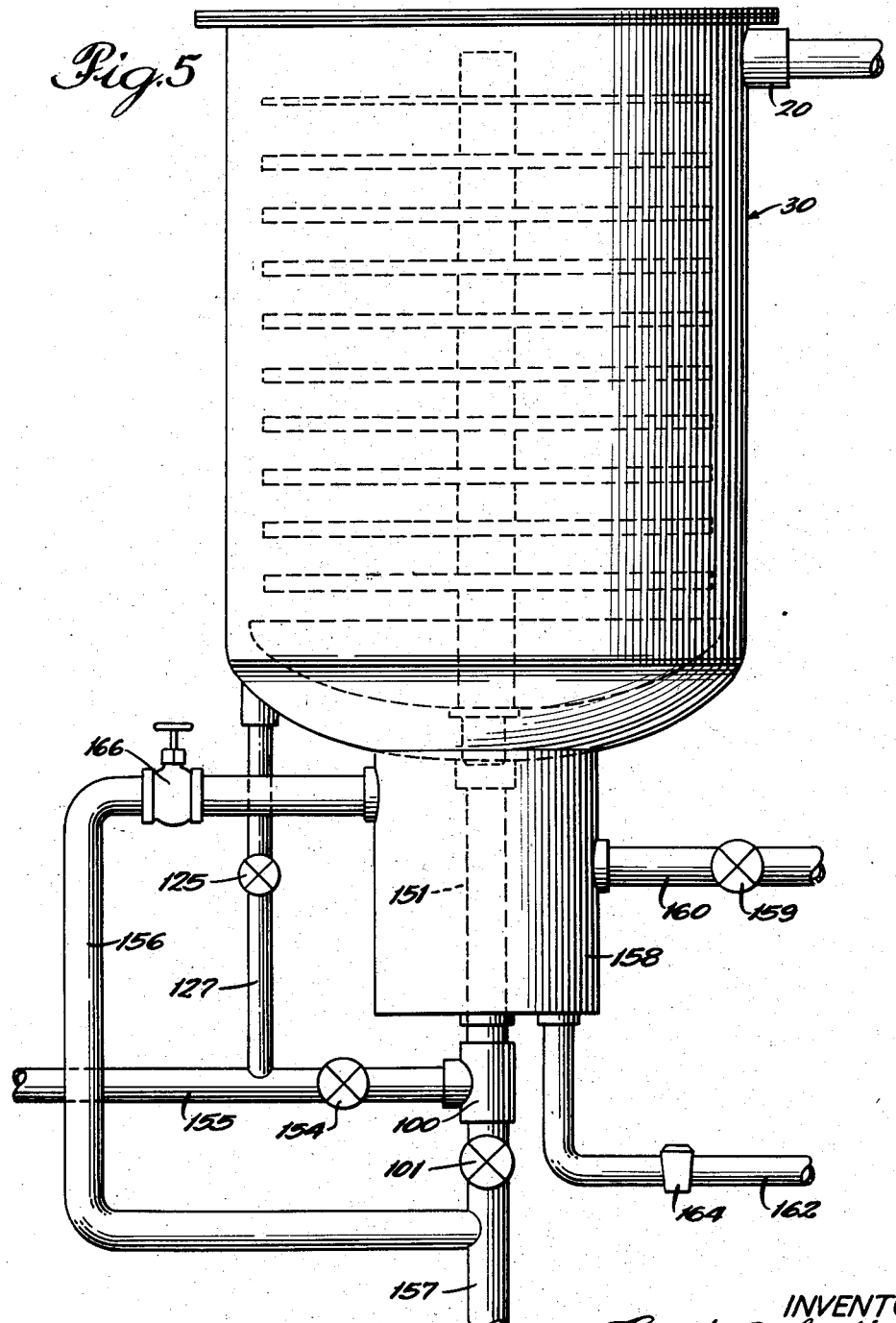

2,925,367

RECLAIMER FOR FILTER MUCK

Carl A. Soelberg, Sioux City, Iowa, assignor, by mesne assignments, to Master Manufacturing Company, Sioux City, Iowa, a corporation of Iowa Application October 14, 1957, Serial No. 689,864

13 Claims. (Cl. 202—176)

This invention relates to an apparatus for recovering cleaning fluid from filter muck which is removed from the filter of dry cleaning apparatus. The apparatus is also designed to transfer the muck from the filter to the recovery unit and simultaneously to clean the interior of the filter.

In dry cleaning clothes a solvent, such as a chlorinated hydrocarbon, is generally used to remove dirt, oils, grease and soil from the clothes. The clothes are tumbled in the presence of the solvent containing suitable detergent, followed by rinse solvent, and after all of the soil has been removed from the clothes by the solvent, it is passed through a filter. The filter usually contains a series of hollow perforated plates or leaves which may or may not be covered with porous fabric bags. A suitable filter media, such as diatomaceous earth is added to the dirty solvent as it passes into the filter. The diatomaceous earth is very light, highly porous material. It builds up on the surface of the plates as a "cake," and serves to strain out most of the soil, fats, dirt, grease and the like which are insoluble in the solvent. After operating for about a week, or in larger plants for a lesser period of time, the filter pressure falls due to decrease in flow through the filter plates by reason of the increased build up of dirt and soil which blocks the pores of the cake. It then becomes necessary to remove the contaminated filter powder, or "muck" as it is called, from the filter. The muck is an extremely dense black solid, very disagreeable to handle. As a rule, the cake of muck is separated from the plates and as much solvent as possible is removed therefrom by compressnig, or squeezing, the muck under air pressure in the bottom of the filter. The diatomaceous earth, however, is highly absorptive and even though it appears to be dry it still contains a good deal of valuable solvent. Fifty pounds (original weight) of diatomaceous earth will retain as much as thirteen to twenty gallons of perchlorethylene and together with the soil will weigh as much as 250 to 300 pounds.

Originally, the muck remaining, after physically pressing out as much solvent as possible, was discarded. More recently, however, it has been proposed to remove the muck from the filter, charge it into a reclaiming apparatus and pass dry steam therethrough to volatilize the solvent from the muck. The steam and the volatilized solvent are condensed and the solvent is separated by gravity from the water. The residue is a dry light material comprising the original filter powder and insolubles removed from the solvent. This process is described in more detail in Cohen Patents Nos. 2,702,433 and 2,755,563, incorporated herein by reference. The Cohen invention emphasizes the necessity of passing dry steam uniformly through the muck at a temperature above the boiling point of the solvent but below the boiling point of the contaminating ingredients in the muck. This results in the distillation of a high purity solvent which is suitable for reuse. The present invention contemplates the use of this basic process in reclaiming the chlorinated hydrocarbon or other solvent from the muck.

A primary object of the invention is to preclude the necessity of shoveling the disagreeable filter muck from the filter to the reclaiming apparatus. The present apparatus is adapted to receive muck in the form of a slurry. The slurry is prepared by admixing additional solvent to the muck while still in the filter. In most filters it is possible to back wash, that is, reverse the flow of the solvent through the filter, which pushes the filter cake off of the filter plates to form a mixture of the muck and solvent. This mixture or slurry, as it is referred to herein, is of pumpable consistency and may be transferred by a suitable pump from the filter to the apparatus of the present invention.

In one preferred form, the present invention consists of a tank or housing containing a plurality of hollow disc having finely perforated walls. The interiors of the hollow discs communicate with a central pipe, which discharges through an opening in the wall of the tank. The liquid slurry is pumped into the container and the muck is separated from the solvent by the discs, the solvent being returned to the filter. The perforated walls permit flow of the solvent therethrough but retain the muck on the surface thereof in much the same manner as the original filter from which the muck was obtained. After all muck has been transferred the excess solvent is permitted to drain from the muck by gravity. To reclaim the remaining solvent in the muck, dry steam is introduced through the same central pipe and passes uniformly through the muck by flowing through the perforated walls of the discs. The apparatus is characterized by a maximum filtering area in a minimum space, which results in rapid extraction.

Another object is to provide an apparatus of this type in which the central pipe and the filter discs affixed thereto may be removed from the tank to discard the dry residue remaining after all of the solvent has been removed from the muck. Another object is to provide an apparatus which transfers all the muck from the filter while simultaneously washing the bags, screens or tubes in the filter of the dry cleaning unit to which it is connected, and subsequently removes all of the cleaning fluid from the transferred muck. These and other objects will become apparent from the following description when read in conjunction with the accompanying drawings, in which:

Figure 1 is a schematic layout of the reclaimer of the invention and the elements normally associated therewith in an operating plant;

Figure 2 is a top view of the reclaimer proper with the lid removed;

Figure 3 is a sectional view taken along the line 3—3 of Figure 2;

Figure 4 is a sectional view taken along the line 4—4 of Figure 3; and

Figure 5 is a view similar to Figure 1 showing an alternative form of water separator.

Referring to Figure 1, the filter comprising part of the dry cleaning apparatus and in which the muck originates is designated by the numeral 10. The internal construction of the filter is not shown but may be of any conventional type supplied with the dry cleaning apparatus which utilizes diatomaceous earth, fuller's earth or other filter powder as the filter media. During the washing cycle, the solvent is pumped through the filter constantly. In time the filter powder becomes contaminated to form muck, and is removed in slurry form by washing with solvent. The solvent is admitted through line 11 from storage chamber of the cleaning machine. Air line 15 connects to the interior of filter 10 to agitate the muck and form a free-flowing slurry. An outlet conduit 12 in the bottom of the filter connects to the inlet side of a centrifugal pump 14 which is adapted to pump slurry which flows from the filter 10 through the line 12. A suitable motor 16 connects to the shaft of the pump 14 to drive the same. Slurry is discharged from the pump 14 through line 18 which connects to the inlet opening 20 in the side of the reclaimer 30 near the top thereof. A valve 22 is disposed in the line 18 for purposes that will become apparent hereinafter. A branch line 24 connects to line 18 downstream of valve 22 at one end, and to a condenser 26 at the other end. The condenser is of conventional construction and contains a coil through which the cold water flows for condensing steam and vaporized solvent discharged from the reclaimer through line 24. An outlet pipe 28 carries condensed solvent and water to the gravity separator 32. In the case of chlorinated hydrocarbon solvents, which are heavier than water, the solvent is removed through the line 34 while the water overflows through line 36. If the solvent is lighter than water the outlets are reversed.

The reclaimer 30 consists of a cylindrical tank or housing 38 having an open top which is normally closed during operation by means of a lid 40 which may be bolted to a flange 41 extending radially from the tank against a suitable synthetic rubber gasket 42 which is resistant to the solvent action of the particular solvent being reclaimed. Any suitable pressure-resisting closure may be employed. The tank 38 is normally considerably smaller than the filter 10. A central pipe 44 is disposed axially within the cylindrical tank 38. A series of hollow discs 46 having completely perforated walls which are adapted to permit fluid flow therethrough communicate with the central pipe 44. The discs are mounted at spaced intervals along the length of the pipe 44. The bottom of pipe 44 is detachably connected to outlet opening 48 which in turn leads to a conduit 50. As the slurry is being pumped into the reclaimer the solvent flows through the filter discs 46, into the central pipe 44, out through the conduit 50 and back to the filter 10 through line 55. The returned solvent washes the remaining muck from the filter. A suitable valve 54 is provided in the line 50 to shut off that line when the apparatus is operating on the reclaiming cycle. A solvent receiver 52 may be provided beneath pipe 57 if it is desired to remove solvent at this point rather than circulate it back to the filter.

Branch line 56 connects with the line 50 upstream of valve 54 and leads to a water separator 58 for removing moisture from steam. Steam used in the reclaiming process is introduced through line 60 which connects to the water separator 58 near the top thereof. Separated moisture which falls to the bottom of the cylindrical separator 58 flows into the line 62, which contains a suitable trap 64. The valve 66 in line 56 is of the throttling type and is adapted to reduce the steam pressure from, say, sixty-five pounds to about five pounds, or thereabouts. The dry low pressure steam flows in the reverse direction through the line 50 during the reclaiming cycle.

The temperature of steam entering line 60 is determined by the boiling point of the solvent being reclaimed. If superheated steam is used, the moisture separator 58 is not necessary. But in most dry cleaning plants only saturated steam is available and it usually contains some moisture which must be removed. Another suitable way for drying the steam is to provide a riser from the main line to supply line 60. The steam which rises vertically usually contains only a small amount of moisture, which may be taken up by throttling the valve 66. As the steam is throttled through valve 66, expansion occurs on the downstream side with accompanying drying. Consequently, both the separator 58 (and/or riser) and the valve 66 serve to dry the steam.

Referring in particular to Figures 2, 3 and 4, the construction of the reclaimer 30 will be considered in more detail. The central pipe 44 is made up of a plurality of sections 68 and 69. Section 69 has a spider 73 with a central opening for supporting the rod 90. Each of these sections are cylinders which have radially extending flanges 65, 67 which are riveted or otherwise suitably connected together with the hollow disc 46 sandwiched therebetween. The upper end 70 of each of the sections 68 is flared to a larger diameter than the section 69 so that they telescope. These complementary sections may be of any desired length and determine the spacing between the filter discs 46. It will be obvious that the pipe and disc assembly may be joined in other ways while still accomplishing the purpose of supporting the discs at spaced intervals within the tank and having the interiors thereof in communication with the interior of pipe 44.

Figure 4 shows in enlarged section the construction of the filter disc in one form. The outer wall of the disc consists of fine wire screen cloth 72 which is shaped to form a hollow disc about a suitable internal porous support which prevents the walls from collapsing under pressure. In the form illustrated in the drawing, the support consists of a rather heavy coarse wire screen 74. The edges of the discs 46 are finished by means of a circumferential rim or ring 76. The wire screen cloth 72 preferably is made from stainless steel, as are all of the internal parts of the present apparatus. They may, however, be made of galvanized steel or other suitable material which is impervious to attack by chlorinated hydrocarbon solvents or other solvents that might be reclaimed in the apparatus.

It will be understood that a suitable porous core may be formed from radially corrugated metal discs in place of the coarse wire screen 74. In such construction fluid flow is along the troughs of the corrugations from the circumference to the center of the disc. The material from which the core is made is not critical so long as it serves to prevent collapse of the fine screen 72 under pressure and permits liquid flow through the hollow interior of the disc 46 to the interior of the central pipe 44.

A pan 78 is secured to the bottom of the pipe 44 for catching any residue left from the muck as the pipe and disc assembly is removed from the tank 38. To facilitate removal of the segmented pipe and disc assembly, I have provided a central rod 90 which is fixed to the lower end of the pipe 44 by means of a pin 92 which extends transversely across the pipe 44. Rod 90 is centered by means of spiders 73 which comprise a portion of the cylindrical sections 69. A wing nut 94 screws onto the uppermost threaded end of the rod 90 against a cap 96 which fits over the top element 68. Just below the pan 78 a nipple 80 is fixed to the flange 45 extending radially from the bottom of the pipe 44. Securing means may comprise rivets 82 or other suitable means which may also lock pan 78 to the pipe. The lower end of the nipple 80 is tapered to fit into the complementary outlet fitting 48 welded to the opening 86 in the bottom of the tank 38. Conduit 50 screws into the threads of fitting 48.

It will be noted that instead of a hollow porous disc 46, the uppermost element secured to the pipe 44 comprises a perforated plate 98. The purpose of the plate is to prevent slurry or solvent entering the pipe 20 from splashing against the uppermost disc 46 and removing the muck cake therefrom. This plate is not necessary, however, and the apparatus will operate with another porous disc 46 in place thereof.

A suitable lid 40 is provided to cover the tank 38 while the unit is in operation. The lid rests on radial flange 41 comprising part of the tank and is sealed by means of gasket 42 and bolts.

It is believed that the operation of the unit will be self-explanatory from the foregoing description but for a complete understanding it may be well to review the operation briefly. Filter muck slurry comprising solid muck dispersed in solvent flows from the filter 10 through line 12 under the suction of the centrifugal pump 14, which moves the slurry under pressure through line 18 into the reclaimer 30. At this point the valve 22 is open and the valve 23 is closed. The slurry rapidly fills up the tank 38 and covers the discs 46. The solvent, following the line of least resistance, flows through the open areas of the porous discs, that is, those areas which have not previously been covered with muck. After tank 38 is full the pumping continues and the solvent is circulated back to the filter 10 through lines 44, 50 and 55. The flow of solvent through the filter is preferably in the backwash direction and serves to wash the bags or screens clean of all muck solids. That is, the solvent enters the interior of the filter bags or screens, flows through them to remove the muck and carries the muck back to the reclaimer 30. In a short time all the muck has been removed from the filter. Since the muck is extremely heavy and dense, it will gradually build up in a thick cake on the surface of the porous screen 72 through which solvent cannot flow. Consequently, it is necessary to provide an extremely large porous area so that circulation may continue until all the muck is in the reclaimer and the filter is washed clean. The solvent which passes through the screen 72 flows radially through the interior of the hollow discs around the porous support 74 and falls into the interior of the pipe 44. Solvent flow from each of the discs converges in the pipe and is discharged from the tank 38 through fitting 48 into the discharge line 50. During this operation the valve 54 in line 50 is open and the valve 66 in line 56 is closed. Valve 59 in line 60 is closed completely to prevent any steam from flowing into the line 50 during the filling cycle. This can also be accomplished by closing valve 66 but since this is a throttling valve, it is a little easier to operate by means of valve 59, and avoid resetting valve 66.

The pump is shut off after transfer of the muck has been complete. This may be ascertained by looking at the solvent flowing in line 18 through a sight glass 19. To insure removal of as much of the free solvent as possible from the muck which has been pumped into the reclaimer 30, valve 25 in line 27 is opened and the solvent is allowed to drain by gravity. After as much of the free solvent as possible has drained from the muck, the valves 22 and 54 are closed and valves 59 and 23 are opened. This initiates the reclaiming cycle which removes all of the solvent that is absorbed by the pores of the filter powder. Steam at, say, sixty pounds per square inch pressure (approximately 307° F.) flows from line 60 into the moisture separator 58. Any free moisture in the steam falls out and is removed from the separator through trapped line 62. Saturated steam from which substantially all of the moisture has been removed then flows through line 56 and throttling valve 66. Valve 66 reduces the pressure to less than 10 pounds per square inch whereupon a certain amount of expansion and further drying of the steam occur. The dry, low pressure steam having a temperature above 212° F. flows into the central pipe 44 and outwardly into the hollow space between the porous walls 72 of the discs 46. It will be appreciated that the very tiny openings through the walls 72 permit the steam to permeate uniformly through the entire mass of muck. The steam causes solvent therein to vaporize and the vaporized solvent together with the steam flow upwardly through tank 38 into line 24, and through the condenser 26. The solvent and the steam are condensed and then separated in the gravity separator 32.

After the extraction of the solvent from the muck has been completed, the top 40 is removed from the tank 38 and the dry, light, powdery residue remaining therein is removed by lifting out the pipe-disc assembly. This is done by grasping the wing nut 94 and lifting the entire assembly from the tank. The pan 78, being imperforate, prevents solid material from falling into the bottom of the tank. Because the fitting 80 connected to the bottom of the pipe 44 fits into the oulet by means of a tapered press fit, it is not necessary to disconnect the pipe from the outlet. The connection breaks upon lifting of the pipe by means of the rod 90.

It will be appreciated that by use of the present apparatus the dry cleaner can empty his filter daily rather than weekly because it is done automatically rather than by shoveling the muck from the filter. Consequently, the filter can be operated in a much more efficient manner since the pressure does not build up to any appreciable extent. Before the filter powder builds up to a thick relatively impervious cake, it is removed by back washing to the reclaimer 30. The muck may be allowed to accumulate in the reclaimer until it is full, whereupon the extra cycle can be initiated. Furthermore, the invention simultaneously provides the advantage of thoroughly washing the filter bags or screens.

Figure 5 shows an alternative form of the invention in which the moisture separator 58 for the steam has been welded to the bottom of the tank 38 to heat the contents thereof. The separator in Figure 5 is identified by the numeral 158 and cooperating elements are likewise given the same number as the corresponding part of Figure 1 with the prefix "1." The separator 158 is larger in diameter and shorter than the separator 58. Steam from supply line 160 at a pressure of say 40 to 60#/in.$^2$ enters the separator 158 at about the midpoint thereof. A drain line 162 containing a trap 164 serves to drain off condensed steam from the bottom of the separator. Line 156 containing the reducing valve 166 connects to the separator near the top thereof for conducting dry steam to the central pipe 151 which extends along the axis of separator 158 and merges with the lower end of pipe 44 in the reclaimer. A T 100 connects pipe 151 to line 155 leading to the filter. The other branch of the T connects to the dry steam line 156. A valved drain line 157 leads from the bottom of the T. Another drain line 127 connects to line 155 and may serve to conduct free solvent from the muck to the filter or to a storage tank comprising part of the dry cleaning machine.

While muck is being transferred from the filter to the reclaimer solvent flows from pipe 151 into line 155 and back to the filter. At this time valve 101 is closed to prevent flow into line 156. Valve 154 is open. Steam valve 159 is closed. After the filter is clean and all the muck has been transferred, the free solvent is drained from tank 38 thru line 127 by opening valve 125. The solvent flows into line 155 and back to the cleaning machine storage tank. After all the free solvent is drained the valves 125 and 154 are closed. Valves 159 and 101 are opened. The steam enters the separator 158 and the moisture therein falls to the bottom and passes out the drain line 162. The dry steam leaves the separator thru line 156, is reduced to operating pressure by throttling valve 166. The low pressure, dry steam enters the hollow perforated plates of the reclaimer thru line 151 to volatilize solvent from the muck in the tank 138, as previously explained.

By placing the separator 158 directly beneath the reclaimer, the reclaimer may be used as a still for distilling solvent from liquid residue. The plates 46 are preferably removed from tank 138 when it is used as a still. The heat from the steam in the separator 158 raises the temperature of the bottom of tank 138 to heat the contents thereof. Valve 101 may be closed when using the apparatus as a still, to prevent liquid contents from flowing out of the tank and to prevent steam from flowing into the tank. The steam flows out of the separator thru line 162. If it is desired to run live steam into the liquid residue in tank 138 valve 101 may be opened after the distilling operation has begun. The steam pressure also may be regulated by throttling valve 166. The solvent evaporated from the liquid residue is condensed in condenser 26 and separated in gravity separator 32 as previously explained.

The modified construction of Figure 5 also provides additional heat to the tank 138 for raising the temperature of the muck during muck reclaiming.

Other modifications of my invention will occur to those skilled in the art. It is not my intention to limit the invention to the particular illustrative forms shown and described, otherwise than as necessitated by the scope of the appended claims.

What I claim as new and desire to secure by Letters Patent of the United States is:

1. Apparatus for reclaiming solvent from filter muck in slurry form which comprises an elongated housing, a central axially-extending tube disposed within said housing being closed at one end and communicating at the other end with a solvent outlet near one end of the housing, said tube having a series of hollow porous-walled discs spaced along its length normal thereto and communicating with the interior of said tube, an inlet for muck slurry connecting to said housing, means for introducing steam into said solvent outlet for flow outwardly through said discs, and means for conducting steam and vaporized solvent from said container to a condenser.

2. Apparatus for reclaiming solvent from filter muck in slurry form which comprises an elongated cylindrical housing, a central axially-extending tube disposed within said housing being closed at one end and communicating at the other end with a first opening in one end of the housing, a series of hollow discs having perforated walls for permitting fluid flow therethrough mounted on said tube at spaced points along its length, the interior of said discs communicating with the interior of said tube, a valved steam conduit leading to said first opening for flow outwardly through said discs, a valved liquid-solvent-outlet conduit leading from said first opening, a second opening in said housing near the end opposite said first opening, a valved muck slurry conduit leading to said first opening and a valved steam-vaporized solvent conduit leading from said first opening to a condenser.

3. Apparatus for reclaiming solvent from filter muck in slurry form which comprises a cylindrical tank open at the top and having a first opening in the bottom thereof and a second opening in the side wall near the top thereof, a central axially-extending tube disposed within said tank having one end thereof closed and the other end detachably connected with said first opening, a series of hollow discs having perforated walls for fluid flow therethrough mounted on said tube at spaced points along its length, the interior of said discs communicating with the interior of said tube, a pan of diameter at least equal to said discs secured to said tube beneath said discs, and means connected to said tube for lifting the tube, the discs and the pan as a unit from the tank through said top.

4. Apparatus of claim 3 wherein said lifting means consists of a rod extending down the center of said tube and fixed to the lower end thereof.

5. Apparatus of claim 3 wherein the perforated walls of said hollow discs are formed of fine wire cloth internally supported against collapse by coarse wire cloth.

6. Apparatus for reclaiming solvent from filter muck in slurry form which comprises a cylindrical tank having a first opening in the bottom thereof and a second opening in the side wall near the top thereof, a central axially-extending tube disposed within said tank having one end thereof closed and the other end detachably connected with said first opening, a series of hollow discs having perforated walls made from fine wire screen cloth mounted on said tube at spaced points along its length, said discs being internally supported against collapse by relatively coarse screen and being in communication with the interior of said tube, conduit means for supplying dry steam to said first opening and said discs in communication therewith for flow outwardly through said discs, and conduit means leading from said second opening to a condenser.

7. Apparatus of claim 6 wherein a perforated plate is mounted in said tank above and parallel to the uppermost disc but below said second opening.

8. Apparatus for reclaiming solvent from filter muck in slurry form which comprises a cylindrical tank open a the top and having a first opening in the bottom thereof and a second opening in the side wall near the top thereof, a detachable leak-tight cover for said top, a central axially-extending tube disposed within said tank having one end thereof closed and the other end detachably connected with said first opening, a series of hollow discs having walls made from wire screen cloth and porous internal support means for preventing said walls from collapsing, said discs being mounted normal to said tube at spaced points along its length, the interior of said discs communicating with the interior of said tube, said first opening connecting to two valved branch lines, one of which connects with a source of dry steam and the other of which discharges to a liquid solvent receiver, said second opening connecting to two valved branch lines, one of which connects to a source of filter muck slurry and the other of which discharges to a condenser.

9. Apparatus for reclaiming solvent from filter muck which comprises a tank having a plurality of hollow discs mounted normal to and at spaced points along the axis thereof, said discs having perforated walls for permitting fluid flow therethrough, conduit means within the tank communicating with the hollow interiors of each of said discs and connecting at one end with a discharge line externally of said tank, said conduit being closed at the other end, means for supplying steam to said conduit means for flow outwardly through said discs, and means for conducting steam and vaporized solvent from said tank to a condenser.

10. Apparatus for reclaiming solvent from filter muck in slurry form which comprises an elongated housing, a central axially-extending tube disposed within said housing being closed at one end and communicating at the other end with a solvent outlet in one end of the housing, said tube having a series of hollow porous-walled discs spaced along its length normal thereto and communicating with the interior of said tube, an inlet for muck slurry connecting to said housing, a separator for removing moisture from steam comprising a cylindrical shell secured to the bottom of said housing, a pipe extending axially thru the bottom of said shell and connecting at its upper end to said solvent outlet, a steam source connecting to said shell, conduit means for conducting steam from said shell to the end of said pipe below said shell, and means for conducting steam and vaporized solvent from said container to said condenser.

11. The apparatus of claim 10 wherein said conduit means contains a throttling valve.

12. The apparatus of claim 10 wherein said shell has a trapped drain line connected to the bottom thereof.

13. The apparatus of claim 10 which includes a line for conveying slurry from said pipe connecting to said pipe at a point below said shell.

References Cited in the file of this patent

UNITED STATES PATENTS

| | | |
|---|---|---|
| 2,507,126 | Townsend | May 9, 1950 |
| 2,597,235 | Ericson | May 20, 1952 |
| 2,651,418 | Prendergast | Sept. 8, 1953 |
| 2,702,433 | Cohen | Feb. 22, 1955 |